Figure 1:
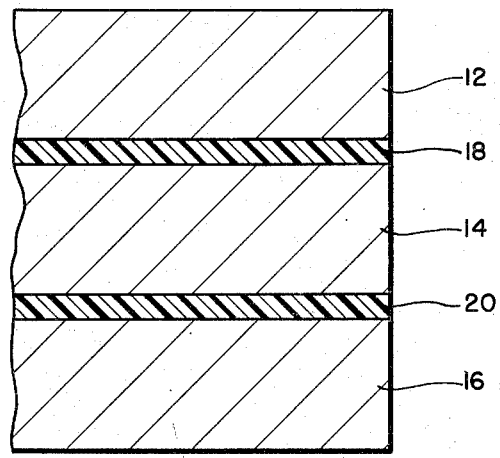

April 9, 1957  N. J. SHEERAN  2,788,305
METHOD OF FORMING AN ADHESIVE FOR INSULATION
BOARDS AND THE PRODUCT THEREOF
Filed June 23, 1954

INVENTOR.
NORMAN J SHEERAN
BY

United States Patent Office 2,788,305
Patented Apr. 9, 1957

2,788,305

METHOD OF FORMING AN ADHESIVE FOR INSULATION BOARDS AND THE PRODUCT THEREOF

Norman J. Sheeran, Seattle, Wash., assignor to American-Marietta Company, Seattle, Wash., a corporation of Illinois Application June 23, 1954, Serial No. 438,881

13 Claims. (Cl. 154—138)

My invention relates to soy flour protein adhesives and, more particularly, to a method of forming an adhesive for insulation boards and the product thereof.

Briefly, the invention concerns laminating insulation boards with a soya flour adhesive which minimizes the destruction of the water resistant characteristics of the boards that has occurred with prior adhesives. As will appear hereafter, the discovery includes strictly limiting the amounts of materials which form sodium hydroxide in the adhesive, because more than minimal amounts have deleterious effects on water resistance within the bonds laminated. Lime is here used as a predominate base, both quantitatively and qualitatively, serving as an agent to insolubilize the adhesive and as a replacement for alkali metal bases.

*The need for laminated insulation boards.*—In the drawing, Figure 1 is a sectional, fragmentary view of a plurality of insulation boards 12, 14, 16, bonded together with an adhesive forming glue lines 18, 20. My invention resides in a particular adhesive which is advantageous in forming these bonds.

Insulation boards of an inch or more in thickness are frequently used for roof panels and for roof insulation boards. For several reasons it is more desirable to produce two plies ½ inch thick and to bond them together than to make a single one inch thick board. Reduced production is obtained with the one inch board. For example, a plant may produce an average of one hundred tons of board stock per day of ½ inch board and may produce an average of only fifty to ninety tons per day of one inch board. Furthermore, it is difficult or impossible to provide adequate strength if the board thickness is too great. The maximum thickness is also dependent on the density of the board. The lower the density the greater is the thickness that can be feasibly produced. Previously to the present invention, laminated boards had inferior moisture resistance compared with single-ply boards and the laminated boards often delaminated in the area of the glue line under high moisture conditions, showing deleterious effects on the adhesive.

*The properties of insulation boards.*—The term "insulation board" is used in the trade to classifly low-density composition boards or soft boards weighing approximately eight to twenty-five pounds per cubic foot. The insulating and sound absorbing properties decrease as the density increases; but strength increases with increasing density. At densities over twenty-five pounds, the boards are medium density or hardboard and are not satisfactory for primary use as insulators or sound absorbers.

Insulation board is produced from wood fibers or bagasse or other like cellulosic fibers. The examples cited herein are of insulation board formed from wood fibers. The invention is applicable to such bagasse or other fibrous boards.

*The insulation board sizing.*—Asphalt, wax or rosin size is commonly added to insulation board for water resistance. The examples cited herein are of boards using asphalt sizing. The improved results using my invention with asphalt sized boards clearly indicate improved results in wax and rosin sizes because water resistance is secured by essentially the same mechanism. Water resistance is obtained by generally coating the fibers with a thin uniform layer of sizing which "repels" water. The sizing will not permanently stop water absorption but it slows the rate of water absorption. If a board is exposed to water, the fibers will in time become as water saturated as if no sizing material were present, but saturation takes a much longer time in the presence of size. In forming the board, alum is added to the wet pulp furnish to obtain a uniform deposit of sizing particles on the pulp fibers, the sizing particles being deposited from an "emulsion" upon acidification of the furnish. It is commonly believed that trivalent aluminum ions attach themselves to both the sizing materials and the pulp fiber as the alum is added, thus essentially acting to bond together the two materials. Asphalt or bitumen sizing, commonly used for insulation board, is obtained from the residue of thermal distillation of petroleum. One commercial asphalt emulsion used for sizing has a pH of about 9, a solids content of 50–60%, and an average particle diameter of 1–4 microns.

*The problem*

A high degree of water resistance in laminated insulation board is desirable since the boards may be stored for several months under exposed conditions at construction sites. The laminated boards are often used as roof insulation or panels and leaks occasionally develop which subject the laminated panels to water from rain or snow. Prior adhesives appear to have reduced the efficacy of the moisture-resistant sizing in the area of the glue line, leading to easy delamination when exposed to such conditions. Moisture appears to enter through the fibers adjacent the glue line whose water resistant size has been made ineffective. Laminated panels should exhibit sufficient water resistance to withstand these exposure conditions and it is an important object of this invention to maintain the water resistance of the panels after lamination. To state the object another way, it is desired to maintain the efficiency of the sizing material and to prevent transmission of moisture by the glue line itself in laminated panels.

One revealing measure, showing the improvement obtained with this invention, will be termed a "wicking" test. One wicking test procedure is as follows:

Laminated panels, after aging for one week at room temperatures following production, were cut into 7 inches by 7 inches by 1 inch squares. These squares were soaked horizontally under water at room temperature for ninety-six hours with the water level approximately 1½ inches above the glue line, hence the panels were completely immersed. After this soak period, the panels were sawed in half (7" x 3½" x 1") and the extent of visible penetration of moisture on the freshly exposed glue line was measured.

If wicking had occurred, the freshly exposed glue line and adjacent areas would be wet and dark; and, if wicking had not occurred, the freshly exposed glue line and adjacent areas would be unchanged in appearance from samples that had not been soaked. The test pieces were also delaminated at or near the glue line by cleaving with a knife and the force necessary to cause this delamination was estimated. This force is termed the "wet bond." If appreciable wicking had occurred, the force required for delamination would be small and delamination would occur at or near the glue line, leaving the glue line as a wet intact film. If little wicking had occurred, a considerable force is necessary for delamination and the delamination occurs in the body stock of the laminate rather than at the glue line.

When considerable wicking occurred, the glue line often could be stripped out in its entirety and was still tough and flexible although thoroughly wet. The inadequate water resistance in such cases is clearly not due to a lack of water resistance in the adhesive itself, although there is the possibility that the glue line has transmitted water to the fibers.

If insulation board panels laminated with prior art soy flour protein adhesives are so immersed in water for a period of one to four days, these panels will exhibit virtually complete wicking; and these panels will virtually delaminate of their own accord in the wicked area or can be delaminated by a minimum cleavage force. As will be noted from later examples of certain tests, the prior art adhesives wicked virtually the complete 7 inches, or 100% of the possible distance; whereas under like tests the present adhesive wicked as little as one and three-quarter inches, or only 25% of the total.

The results obtained will be tabulated hereafter, but it may be noted that the measurements have certain limitations: For example, the force required for delamination is applied manually and the estimates of force may have varied on occasion. Also, some difference in results may be seen with various insulation boards on the market and with different assembly times.

It is another object of my invention to obtain a good or at least fair wet bond and to prevent the wicking approaching 100% in moisture conditions comparable to those occurring in the field.

The invention

Wicking is apparently caused to some degree by one or both of the following mechanisms:

A. The effectiveness of the sizing material in adhesively laminated boards has been destroyed to some degree. As stated before, the effect of the sizing is to slow the rate of water absorption.

B. The glue line transmits water even though the sizing material has not been destroyed to any great extent.

The important criterion is the water resistance shown by the laminated panels themselves, i. e., the water resistance of panels laminated with a completely waterproof adhesive may be actually less than panels laminated with a merely water resistant adhesive.

*The action of sodium hydroxide.*—Prior art soy flour protein adhesive contained materials forming substantial quantities of sodium hydroxide in the wet mix formulation. Such materials included sodium hydroxide added as a base and sodium compounds used as fungicides or rodenticides. From 2% to 25% sodium hydroxide solids based on the weight of the air dry soy flour protein commonly were formed in the adhesive by such materials. It has been discovered that the water resistance of laminated insulation board panels is very substantially decreased if there is as much as about 1% or more sodium hydroxide (as such), based on the air dry soya protein, in the wet-mix glue formulation.

It is a feature of the present invention that only a minimum of sodium hydroxide is present in the adhesive formulation. Sodium hydroxide is classifiable with other alkali metal bases, such as potassium hydroxide, which are strong, highly soluble bases and have like destructive effects on the insulation board sizing.

*The use of lime as a base.*—To further explore the mechanisms involved in this invention and the use of lime as a base, certain experiments with ammonium hydroxide are instructive. Poor wicking results are obtained if ammonium hydroxide is used alone in any substantial concentration. However, in adhesives containing considerable amounts of lime, such as are cited in Formulation I hereafter, satisfactory results have been obtained by adding up to 2.5% ammonium hydroxide, calculated as such, based on the air dry soy flour protein, i. e., 4.5% of ammonium hydroxide solution containing 28% NH₃. When the amount of added ammonium hydroxide, as such, was increased to about 4% of the flour protein weight, somewhat less satisfactory results were obtained but they were still better than the results in the absence of lime. The difference in results between adhesives with and without lime would appear to be due to the formation of an insoluble protein complex when lime is used. Such insoluble protein would not readily transmit water through the glue line. If no lime were used, the protein would not be insolubilized and the glue line would transmit water exposing the adjacent cellulosic fibers to this water. Since the size only delays the rate of absorption of water, the fibers adjacent to a wet glue line will wick more readily than the fibers adjacent to a dry glue line.

To restate the teaching of this experiment, it appears that at least one of the functions of lime is to adequately insolubilize the protein glue line. The ammonium hydroxide would have the same capacity to affect the sizing materials both in the presence and absence of lime; and the better results in the lime formulation might be that the lime insolubilizes the glue line and reduces the amount of water available to act on the fibers.

Prior art soy flour protein adhesives, containing substantial amounts of sodium hydroxide, have commonly contained up to 10% lime, based on the weight of the air dry soy protein, and the moisture resistant properties of insulation boards bonded with such adhesives have been generally poor. I have discovered that if sodium hydroxide is instead avoided or reduced to a small concentration, fairly good water resistance is attained with a minimum of about 6% lime and optimum results from all considerations, are obtained when 20% to 50% lime is used.

Other objects of my invention include, therefore, avoiding or limiting alkaline materials which destroy the sizing in the insulation board. From the foregoing discussion, it will be understood that this means minimizing or avoiding the use of strong, highly soluble bases, e. g., sodium hydroxide. Another object of the invention is to use sufficient lime to insolubilize the soy flour protein used in the adhesive.

*Further observations.*—Another possible explanation of the ineffectiveness of prior art adhesives is that the sizing material is affected in one of three ways:

A. The sizing material is dissolved to some degree by the alkaline (basic) components of the protein adhesives. If this is true to any degree, the solubility of these materials should be considerably greater in sodium hydroxide than in lime.

B. Upon exposure to water, the sizing material is "re-emulsified." For this to happen, soluble soaps or other wetting agents would need to be present. Sodium hydroxide would form these soaps or wetting agents to a much greater degree than would lime.

C. The sizing material is "knocked loose" from the fiber. This case is in distinction to the above two cases where the size is solubilized or re-emulsified.

In case "C" the size still exists as distinct physical particles but the bonding of the sizing material to the cellulosic fibers has been destroyed. A very strong base such as sodium hydroxide would do this to a greater degree than lime.

The critical factor in the invention does not appear to be the degree of alkalinity of the overall mixture. Optimum water resistance is generally obtained with a pH of 11.5 to 12.5 with the adhesive of this invention, and comparable water resistance is not obtained with prior adhesives of pH values ranging from 7.5 to 13.5. The means by which the alkalinity is obtained appears to be a more important factor, i. e., the high pH lime adhesive of this invention does not destroy the asphalt sizing to the same degree as do the high pH sodium hydroxide adhesives of the prior art.

Various objects of the invention have been stated or are implicit in the foregoing discussion. Further objects and advantages of the invention will appear from the following formulations and discussions about them:

| Formulations | I | II | III | IV |
|---|---|---|---|---|
| Water, 25 degrees C | 1,510 | 1,680 | 1,560 | 1,650 |
| Antifoam (Coyne Pat. No. 2,524,309) | 3 | 3 | 24 | 24 |
| Alum | 60 | 60 | 0 | 0 |
| Sodium Fluoride (rodenticide) | 3 | 3 | 3 | 3 |
| Soy flour protein | 600 | 600 | 600 | 600 |
| 33% Lime Slurry | 900 | 450 | 900 | 450 |
| Lime Rinse Water | 100 | 150 | 100 | 100 |
| 15% Dow B Solution (fungicide) | 100 | 100 | 100 | 100 |
| pH | 12.2 | 12.2 | 12.2 | 12.2 |

All parts are listed on a weight basis. The following mixing instructions were used in preparing the adhesives:

(1) Add the antifoam, alum, and sodium fluoride to the water and mix until uniform. The alum is papermaker's alum or $Al_2(SO_4)_3 \cdot 18 H_2O$.

(2) Add the soy flour protein and mix until well dispersed (5–15 minutes).

(3) Add the 33% lime slurry. Mix until smooth (5–15 minutes). This slurry is prepared by dissolving 1 part of slaked lime in 2 parts water.

(4) Add the lime rinse water. Mix 2 minutes.

(5) Add the 15% Dow B solution. Mix 5 minutes. The Dow B solution is prepared by dissolving 15 grams Dowicide B (Dow Chemical Company) in 85 grams of water. This additive is used to impart mold resistance to the adhesive and is the sodium salt of trichlorophenol and would form about 0.25% sodium hydroxide, based on the weight of the soy flour.

Following are Formulations V and VI, representative of the prior art formulations for laminating softboards:

*Formulation V.*—Formulation V followed Formulation I, except for a reduction in water from 1510 to 1430 parts, and in addition 54 grams of 33% sodium hydroxide solution was added. This is equivalent to 3% sodium hydroxide solids based on the soy flour protein.

| Formulation VI | Parts by Weight |
|---|---|
| Water, 25 Degrees C | 840 |
| Soy Flour Protein: Mix until uniformly dispersed | 384 |
| Water, 25 degrees C.: Mix until uniform | 500 |
| 33% Lime Slurry: Add gradually over 2–5 minute period | 144 |
| 33% Sodium Hydroxide Solution: Add gradually over 2–5 minute period | 72 |
| "N" Grade Sodium Silicate: Add gradually over 2–5 minute period. This grade silicate contains 8.9% sodium oxide calculated as such. This is equivalent to 11.5% sodium hydroxide based on the silicate weight | 100 |
| Waterproofing Solution="Dope": Mix until uniform. This solution contains approximately 75% carbon disulfide and 25% carbon tetrachloride | 7 |
| pH | 13 |

The available NaOH in the solution was approximately 9.2% of the soya flour weight.

Insulation board panels were laminated with the adhesive Formulations I to VI by the following procedure: One side of a 12" x 12" x ½" commercial insulation board was spread with 30–35 grams of each adhesive formulation. An unspread board of the same dimensions was placed on the glue line of the first board, forming a two-ply assembly. From 1 to 15 minutes later, this period being termed the "assembly time," the two ply assemblies were subjected to a pressure of 40 pounds per square inch for 5 minutes. These panels were cut to 7" x 7" x 1" squares for test purposes.

The previously described soak test was used to evaluate wet bonds and these results are tabulated below:

TABLE I

| Formulation | | Assembly Time, Minutes | Total Wicking, Percent | Inches | Wet Bond |
|---|---|---|---|---|---|
| I | a | 1 | 25 | 1.75 | Good. |
|   | b | 7 | 29 | 2.0 | Good. |
|   | c | 15 | 64 | 4.5 | Fair. |
| II | a | 1 | 25 | 1.75 | Good. |
|   | b | 7 | 36 | 2.5 | Good. |
|   | c | 15 | 67 | 4.7 | Fair. |
| III | a | 1 | 45 | 3.25 | Good. |
|   | b | 7 | 57 | 4.0 | Good. |
|   | c | 15 | 45 | 3.25 | Good. |
| IV | a | 1 | 50 | 3.5 | Good. |
|   | b | 7 | 71 | 5.0 | Fair. |
|   | c | 15 | 68 | 4.75 | Good. |
| V | a | 1 | 100 | 7 | Poor. |
|   | b | 7 | 100 | 7 | Poor. |
|   | c | 15 | 100 | 7 | Poor. |
| VI | a | 1 | 100 | 7 | Poor. |
|   | b | 7 | 100 | 7 | Poor. |
|   | c | 15 | 100 | 7 | Poor. |

The apparent reason for poorer results with longer assembly times may be due to a greater length of time available for the highly alkaline protein adhesive to react with the surface fibers before the glue alkalinity is partially neutralized upon being driven into the body stock of the board under the bonding pressures used. The same formulation may produce slightly different results on various boards, perhaps depending on the acidity of the board stock.

Formulations I and II contain 10% alum based on the soy flour protein and Formulations III and IV, which do not contain alum, produce comparable results. Subsequent tests have shown that the use of alum is not necessary for good results. The lime content, based on the soy flour protein, is 50% for Formulations I and III and 25% for Formulations II and IV. Substantial improvement over prior art formulations has been found using from about 6% to 70% lime based on the soya flour protein, but the preferred lime content is about 20% to 50% when all factors are considered, i. e., water resistance, good spreading characteristics, economy, etc. More than 70% lime can be used but the extra amounts of lime apparently do not serve a useful purpose.

Comparing Formulation V with Formulation I, the addition of 3% sodium hydroxide solids is deleterious to water resistance. A formulation such as V may be considered somewhat typical of some prior art formulations, although generally most prior art formulations do not contain as much lime. Formulation VI, another representative prior art formulation, also produces poor water resistance. As little as about 1% sodium hydroxide solids in the adhesive formulation, based on the soya flour protein, very substantially decreases water resistance, and, therefore, this is set as the critical concentration for satisfactory results. At this concentration poor results are obtained in the above described wicking test and this test is believed to set a good standard for meeting field conditions to which these laminated boards are subjected.

*Extenders.*—Formulations discussed in connection with Table II, are patterned after Formulations I to IV, except that one of the following extenders was added. All additives are reported in percentage weight based on the weight of the air dry soy flour protein

TABLE II

| | Percent |
|---|---|
| Walnut shell flour | 15, 23 or 30 |
| Wood flour | 10, 20 or 30 |
| Aluminum stearate | 3 |
| Bentonite clay | 33 |

Extenders are embodied in adhesive compositions to reduce glue line costs, body the adhesive for spreading purposes, or impart other desirable characteristics.

Formulations containing such extenders as are listed above had comparable water resistance test results to those of Formulations I to IV. 5% to 50% of such extenders have been used. It is preferable that extender materials be not particularly water absorptive, e. g., have water soluble components that, in the finished board, increase wicking and decrease water resistance. One commercial grade of China clay tested, for example, promoted wicking and thus was undesirable.

*The soya flour protein.*—Satisfactory results have been obtained using various commercial soya flour proteins. It is believed that any commercial solvent-extracted soya flour protein of reasonable quality can be successfully used in the product of this invention. Some examples have had 44% to 54% total protein content of which 13% to 74% of the total protein content consisted of water soluble protein.

*All-lime formulations.*—The following results were obtained in formulations which eliminated NaOH and any agents forming the same in the mixtures. The panels, following the procedures outlined above, were given an estimated 5-10 minutes assembly time.

TABLE III

| Percent Lime Soya | Total Wicking, Inches | Percent |
| --- | --- | --- |
| 6.7 | 4.5 | 64 |
| 10.0 | 4.5 | 64 |
| 13.3 | 4.5 | 64 |
| 16.6 | 5.0 | 71 |
| 20.0 | 5.25 | 76 |

To give two examples of these adhesives, the 6.7% lime formulation consisted of 300 parts by weight soya flour, 900 parts water, 60 parts 33% lime slurry, 50 parts lime rinse water, and 1.5 parts anti-foam. The 20.0% lime example was the same except for having 180 parts 33% lime slurry. Resulting wicking is indicated above. These two formulations are generally typical of the formulations in which the 10.0 to 16.6% concentrations of lime were used.

The following additional examples of lime concentrations appeared in formulations eliminating NaOH and following generally the two examples immediately preceding except for the change in lime content. The test panels were given a 7 minute assembly time and were conditioned and tested as described before:

TABLE IV

| Percent Lime Soya | Total Wicking, Inches | Percent |
| --- | --- | --- |
| 20 | 4.25 | 61 |
| 30 | 5.75 | 82 |
| 40 | 4.5 | 64 |
| 60 | 3.75 | 54 |
| 70 | 5.5 | 79 |

*The effect of sodium hydroxide on wicking.*—Example A below was similar to Formulation I. Boards 7" x 7" were produced as indicated and were soaked 24 hours in accordance with the previously described test procedure and were then cut to 3½ x 7 size.

| Example | Total Inches of Wicking |
| --- | --- |
| A | 0.8 |
| A1 (plus 2% sodium hydroxide) | 7.0 |

Example B was also similar to Formulation I. Boards were also produced but a different soak test was used to evaluate wicking properties. Three inch by six inch samples of board were placed in water of one inch depth for 24 hours, standing them vertically upon one of their three inch side edges. Observable results were:

| Example | Height of Wicking, Inches |
| --- | --- |
| B | ⅛ |
| B1 (plus 1.5% sodium carbonate) | 2.5 |

The amounts of sodium compounds in Examples A1 and B1 are expressed as percent by weight based on the weight of the air dry soy flour protein. The sodium carbonate in Example B1 is equal to 1.1% NaOH.

*Other examples*

| Material | Example C | Example D |
| --- | --- | --- |
| Water | 1,000 | 1,000 |
| Fungicide (Dow G solution) | 20 | 20 |
| Soy flour protein | 400 | 400 |
| 33% Lime Slurry | 600 | 120 |
| Lime Rinse Water | 270 | 104 |
| 33% Sodium Hydroxide | 0 | 24 |
| "N" grade sodium silicate | 0 | 96 |
| Dope | 0 | 6 |
| Water (second addition) | 0 | 700 |
| Average Wicking (horizontal immersion test) | 1.6 | 2.9 |
| Percent Total wicking | 23 | 40 |

The test panels were tested as originally described except that the soak period was reduced to two days. Example C is an all lime formulation, except for a small amount of NaOH formed by the fungicide, and is designated to be used in a cold-setting clamping process where relatively low bonding pressure (less than 20 p. s. i.) is available. In such cases panels must be clamped for about one hour. The Example C panel, as well as the Example D panel, was so clamped for one hour. Example D had a substantially greater amount of sodium hydroxide than Example C; and the Example D test panel wicked, in two days, approximately twice as much as the Example C test panel.

| Material | Example E |
| --- | --- |
| Water | 600 |
| Soy Flour Protein | 300 |
| Antifoam (Coyne) | 7.5 |
| Dow G | 15 |
| 33% Lime Slurry | 450 |
| Water (second addition) | 210 |
| Height of Wicking (Vertical test) | ⅛ |

Dowacide G, a fungicide, is the sodium salt of pentachlorophenol and about 0.38% sodium hydroxide, based on the soy flour protein, is formed. The boards were given about a thirty minute assembly time and then were clamped for one hour. The vertical soak test, described in connection with Examples B and B1, was used to evaluate water resistance. The test results in Example E, where 0.38% NaOH/soya flour is formed, is a very considerable improvement over the test results in Example B1, where 1.1% NaOH/soya flour is formed.

*Prior developments*

*All lime casein adhesives.*—All lime casein adhesive formulations have been used for wood bonding purposes. These casein adhesives may contain up to 30% lime based on the casein and have no sodium hydroxide incorporated. For examples, see "Casein and Its Industrial Uses" by Hans Hodert, published by Chemical Publishing Company (1938). Casein, however, is manifold as expensive as soy flour protein and such casein formulations have not been very successful in the art of laminating wood products due to limited storage life, about 1 hour in the wet mix. The storage life of the soy adhesives of this invention is eight hours or greater in the wet mix which is obviously advantageous in modern manufacturing practices.

It is believed that the casein formulations are not pertinent to the present invention for the following reasons:

1. Casein and soy flour proteins cannot be used interchangeably in the same adhesive formulations. An adhesive formulation has to be designed to use either casein or soy flour protein, and not both interchangeably. One of the reasons for this is that casein has a relatively high protein content of about 70–80% compared with soy flour protein which has a maximum of about 55% protein content. Another reason is that the proteins present in casein are considerably different in physical and chemical characteristics than the proteins present in soy flour. The art and technology of preparing soy flour protein adhesives is in many respects considerably different than the art and technology of preparing casein adhesive formulations.

2. The prior art shows that all materials of high alkalinity destroy the effectiveness of sizing materials. Surprisingly, with the high alkalinity adhesive of this invention (pH around 12), the effectiveness of sizing materials used in insulation board is relatively unaffected.

Having thus discussed my invention, I do not wish to be limited to the exact formulations herein disclosed, and instead, as contemplated by the patent laws, wish to cover those modifications thereof reasonably within the scope of the invention and the following claims.

I claim:

1. As a new product, a board comprising a plurality of glue-bonded plies of fibrous cellulosic boards carrying a moisture-resistant sizing, said boards being resistant to wicking and delamination at the glue line area under the action of moisture, the faces of adjacent plies being bonded together by the set alkaline proteinaceous glue reaction-product of an aqueous mixture of soya flour having a water-soluble protein-content, and lime acting as an alkaline component in an amount of at least 6%, said aqueous mixture being free of any alkali metal base in an amount sufficient to deteriorate the water-resistant characteristics of the sizing, the concentration of any alkali metal base present in said aqueous mixture being chemically equivalent to less than 1% of sodium hydroxide, said percentages being taken on the air-dry weight of the soya flour.

2. The board defined in claim 1 in which the lime is present in an amount between 6% and 70%.

3. As a new product, a board comprising a plurality of glue-bonded plies of fibrous cellulosic boards carrying a moisture-resistant sizing, said boards being resistant to wicking and delamination at the glue line area under the action of moisture, the faces of adjacent plies being bonded together by the set alkaline proteinaceous glue reaction-product of an aqueous mixture of soya flour having a water-soluble protein content, and lime acting as an alkaline component in an amount of at least 6%, said aqueous mixture being free of a water-soluble alkali metal hydroxide in an amount sufficient to deteriorate the water-resistant characteristics of the sizing, the concentration of any alkali metal hydroxide present in said aqueous mixture being chemically equivalent to less than 1% of sodium hydroxide, said percentages being taken on the air-dry weight of the soya flour.

4. As a new product, a board comprising a plurality of glue-bonded plies of fibrous cellulosic boards carrying a moisture-resistant sizing, said boards being resistant to wicking and delamination at the glue line area under the action of moisture, the faces of adjacent plies being bonded together by the set alkaline proteinaceous glue reaction-product of an aqueous mixture of soya flour having a water-soluble protein content, and lime acting as an alkaline component in an amount of at least 6%, said aqueous mixture being free of sodium hydroxide in an amount sufficient to deteriorate the water-resistant characteristics of the sizing, the concentration of any sodium hydroxide present in said mixture being less than 1%, said percentages being taken on the air-dry weight of the soya flour.

5. In the production of a glue-bonded board from a plurality of plies of fibrous cellulosic boards having present a moisture-resistant sizing, the steps of preventing wicking and minimizing the deterioration of the moisture-resistant characteristics of said sizing under the action of moisture and delamination of such plies at the glue line area, comprising applying to the faces of adjacent plies an aqueous mixture of soya flour having a water-soluble protein-content, and lime acting as an alkaline component in an amount of at least 6%, said aqueous mixture being free of a water-soluble alkali metal base in an amount sufficient to deteriorate the water-resistant characteristics of the sizing, the concentration of any alkali metal base in said aqueous mixture being chemically equivalent to less than 1% of sodium hydroxide, said percentages being taken on the air-dry weight of the soya flour.

6. In the production of a glue-bonded board from a plurality of plies of fibrous cellulosic boards having present a moisture-resistant sizing, the steps of preventing wicking and minimizing the deterioration of the moisture-resistant characteristics of said sizing under the action of moisture and delamination of such plies at the glue line area, comprising applying to the faces of adjacent plies an aqueous mixture of soya flour having a water-soluble protein-content, and lime acting as an alkaline component in an amount of at least 6%, said aqueous mixture being free of a water-soluble alkali metal hydroxide in an amount sufficient to deteriorate the water-resistant characteristics of the sizing, the concentration of any alkali metal hydroxide present in said aqueous mixture being chemically equivalent to less than 1% of sodium hydroxide, said percentages being taken on the air-dry weight of the soya flour.

7. In the production of a glue-bonded board from a plurality of plies of fibrous cellulosic boards having present a moisture-resistant sizing, the steps of preventing wicking and minimizing the deterioration of the moisture-resistant characteristics of said sizing under the action of moisture and delamination of such plies at the glue line area, comprising applying to the faces of adjacent plies an aqueous mixture of soya flour having a water-soluble protein-content, and lime acting as an alkaline component in an amount of at least 6%, said aqueous mixture being free of sodium hydroxide in an amount sufficient to deteriorate the water-resistant characteristics of the sizing, the concentration of any sodium hydroxide present in said mixture being less than 1%, said percentages being taken on the air-dry weight of the soya flour.

8. As a new product, a board comprising a plurality of glue-bonded plies of fibrous cellulosic boards carrying a moisture-resistant sizing, said boards being resistant to wicking and delamination at the glue line area under the action of moisture, the faces of adjacent plies being bonded together by the set alkaline proteinaceous glue reaction-product of an aqueous mixture of soya flour having a water-soluble protein-content, lime acting as an alkaline component in an amount of at least 6%, and a water-soluble alkali metal base in an amount insufficient to deteriorate the water-resistant characteristics of the sizing, the concentration of the alkali metal base present in said aqueous mixture being chemically equivalent to between 0.00% and 1% of sodium hydroxide, said percentages being taken on the air-dry weight of the soya flour.

9. An alkaline laminating adhesive composition for bonding a plurality of plies of fibrous cellulosic boards having present a moisture-resistant sizing, said adhesive composition functioning to reduce the wicking of said cellulosic boards and minimizing the deterioration of the moisture-resistant properties of said sizing, said adhesive composition comprising the reaction-product of an aqueous mixture of soya flour having a water-soluble protein-content, and lime in an amount of at least 6%, said aqueous mixture being free of a water-soluble alkali metal base in an amount sufficient to deteriorate the water-resistant characteristics of the sizing, the concentration of any alkali metal base present in said aqueous mixture being chemically equivalent to less than 1% of sodium hydroxide, said percentages being taken on the air-dry weight of the soya flour.

10. An alkaline laminating adhesive composition for bonding a plurality of plies of fibrous cellulosic boards having present a moisture-resistant sizing, said adhesive composition functioning to reduce the wicking of said cellulosic boards and minimizing the deterioration of the moisture-resistant characteristics of said sizing, said adhesive composition comprising the reaction product of an aqueous mixture of soya flour having a water-soluble protein-content, and lime in an amount of at least 6%, said aqueous mixture being free of sodium hydroxide in an amount sufficient to deteriorate the water-resistant characteristics of the sizing, the concentration of any sodium hydroxide present in said mixture being less than 1%, said percentages being taken on the air-dry weight of the soya flour.

11. An alkaline laminating adhesive composition for bonding a plurality of plies of fibrous cellulosic boards having present a moisture-resistant sizing, said adhesive composition functioning to reduce the wicking of said cellulosic boards and minimizing the deterioration of the moisture-resistant characteristics of said sizing, said adhesive composition comprising the reaction product of an aqueous mixture of soya flour having a water-soluble protein-content, sodium fluoride, lime, and a sodium-salt-containing-fungicide, there being present, expressed as parts by weight, 1/200 part of sodium fluoride for every part of soya flour; 0.25 to 0.5 part of lime for each part of soya flour; the sodium-salt-containing-fungicide incorporating in said mixture about 0.25% of sodium hydroxide taken on the air-dry weight of the soya flour.

12. As a new product, a board comprising a plurality of glue-bonded plies of fibrous cellulosic boards carrying a moisture-resistant sizing, said boards being resistant to wicking and delamination at the glue line area under the action of moisture, the faces of adjacent plies being bonded together by the set alkaline proteinaceous glue reaction-product of an aqueous mixture of soya flour having a water-soluble protein-content, sodium fluoride, lime, and a sodium-salt-containing-fungicide, there being present, expressed as parts by weight, 1/200 part of sodium fluoride for every part of soya flour; 0.25 to 0.5 part of lime for each part of soya flour; the sodium-salt-containing-fungicide incorporating in said mixture about 0.25% of sodium hydroxide taken on the air-dry weight of the soya flour.

13. As a new product, a board comprising a plurality of glue-bonded plies of fibrous cellulosic boards carrying a moisture-resistant sizing, said boards being resistant to wicking and delamination at the glue line area under the action of moisture, the faces of adjacent plies being bonded together by the set alkaline proteinaceous glue reaction-product of an aqueous mixture of soya flour having a water-soluble protein-content, and lime acting as an alkaline component in an amount of at least 6%, said aqueous mixture being free of any alkali metal base in an amount sufficient to deteriorate the water-resistant characteristics of the sizing, the concentration of any alkali metal base present in said aqueous mixture being chemically equivalent to up to 1% of sodium hydroxide, said percentages being taken on the air-dry weight of the soya flour.

References Cited in the file of this patent
UNITED STATES PATENTS

| Number | Name | Date |
|---|---|---|
| 1,460,757 | Johnson | July 3, 1923 |
| 1,726,510 | Cone et al. | Aug. 27, 1929 |
| 2,457,108 | Baker et al. | Dec. 28, 1948 |
| 2,460,571 | Chaffee | Feb. 1, 1949 |
| 2,501,827 | Newman | Mar. 28, 1950 |
| 2,637,675 | Bain | May 5, 1953 |